(12) United States Patent
Richardson

(10) Patent No.: US 10,100,953 B2
(45) Date of Patent: Oct. 16, 2018

(54) LIGHTWEIGHT FIRE HOSE COUPLING WITH PROTECTIVE SHOULDER AND METHOD OF MANUFACTURING THE COUPLING

(71) Applicant: Mercedes Textiles Ltd., St. Laurent (CA)

(72) Inventor: Robert Richardson, Cookshire (CA)

(73) Assignee: Mercedes Textiles Ltd., St. Laurent, Quebec (CA)

( * ) Notice: Subject to any disclaimer, the term of this patent is extended or adjusted under 35 U.S.C. 154(b) by 650 days.

(21) Appl. No.: 14/550,282

(22) Filed: Nov. 21, 2014

(65) Prior Publication Data

US 2015/0076818 A1    Mar. 19, 2015

Related U.S. Application Data

(62) Division of application No. 13/788,175, filed on Mar. 7, 2013, now Pat. No. 9,103,474.

(60) Provisional application No. 61/608,847, filed on Mar. 9, 2012.

(51) Int. Cl.
| | | |
|---|---|---|
| *B21K 21/08* | (2006.01) | |
| *B21K 1/76* | (2006.01) | |
| *B21D 51/16* | (2006.01) | |
| *B23P 17/00* | (2006.01) | |
| *B26D 3/00* | (2006.01) | |
| *F16L 15/08* | (2006.01) | |
| *F16L 31/00* | (2006.01) | |

(Continued)

(52) U.S. Cl.
CPC .............. *F16L 15/08* (2013.01); *B23P 13/00* (2013.01); *F16L 31/00* (2013.01); *F16L 33/00* (2013.01); *Y10T 29/49435* (2015.01); *Y10T 83/0529* (2015.04)

(58) Field of Classification Search
CPC ........... Y10T 29/49428; Y10T 29/4943; Y10T 29/49435; Y10T 83/04; Y10T 83/06; Y10T 83/9418; Y10T 83/0529; B26D 1/00; B26D 1/46; B21C 37/00; B21C 37/15; B21C 37/06; B21C 37/28; F16L 11/00; F16L 15/00; B05B 1/00
USPC ............ 29/890.14, 890.141, 890.144; 83/13, 83/682, 684, 686, 689.91
See application file for complete search history.

(56) References Cited

U.S. PATENT DOCUMENTS

| | | |
|---|---|---|
| 1,836,716 A | 12/1931 | Huthsing |
| 1,978,245 A | 10/1934 | Barker |

(Continued)

FOREIGN PATENT DOCUMENTS

| | | |
|---|---|---|
| CA | 2753087 | 3/2016 |

*Primary Examiner* — Sarang Afzali
*Assistant Examiner* — Darrell C Ford
(74) *Attorney, Agent, or Firm* — Ware, Fressola, Maguire & Barber LLP

(57) ABSTRACT

A fire hose coupling includes a substantially annular body having a first end adapted to connect to a fire hose and a second end having male threads. The annular body has a central bore. The coupling includes circumferentially spaced-apart lugs extending radially outwardly from an outer surface of the first end of the body. The coupling further includes a protective shoulder extending radially outwardly from the body between the male threads and the lugs. The protective shoulder has an outer diameter greater than an outer diameter of the male threads to thereby protect the male threads.

19 Claims, 1 Drawing Sheet

(51) Int. Cl.
    *F16L 33/00*     (2006.01)
    *B23P 13/00*     (2006.01)

(56) References Cited

U.S. PATENT DOCUMENTS

| | | | | |
|---|---|---|---|---|
| 4,172,606 A | * | 10/1979 | Howe | F16L 19/00 |
| | | | | 285/148.19 |
| 4,402,531 A | * | 9/1983 | Kennedy, Jr. | F16L 55/1152 |
| | | | | 285/14 |
| 4,717,792 A | | 1/1988 | Sterritt et al. | |
| 5,068,494 A | * | 11/1991 | Bolante | H02G 3/0675 |
| | | | | 174/654 |
| 5,176,177 A | * | 1/1993 | Rupp | A62C 33/00 |
| | | | | 137/561 A |
| 5,261,460 A | * | 11/1993 | Rupp | A62C 33/00 |
| | | | | 137/883 |
| 5,445,226 A | * | 8/1995 | Scott | A62C 31/12 |
| | | | | 169/15 |
| 6,102,444 A | * | 8/2000 | Kozey | F16L 37/252 |
| | | | | 285/376 |
| 6,145,893 A | | 11/2000 | Kuo | |
| 6,733,045 B2 | * | 5/2004 | Harrington | F16L 37/252 |
| | | | | 285/143.1 |
| 9,759,355 B2 | * | 9/2017 | Daugherty | F16L 9/147 |
| 2003/0085570 A1 | * | 5/2003 | Ernst | E21B 17/042 |
| | | | | 285/333 |
| 2003/0193193 A1 | * | 10/2003 | Harrington | F16L 37/252 |
| | | | | 285/376 |
| 2011/0101681 A1 | * | 5/2011 | O'Connor | F16L 15/06 |
| | | | | 285/259 |
| 2012/0211974 A1 | * | 8/2012 | Richardson | A62C 33/00 |
| | | | | 285/93 |

\* cited by examiner

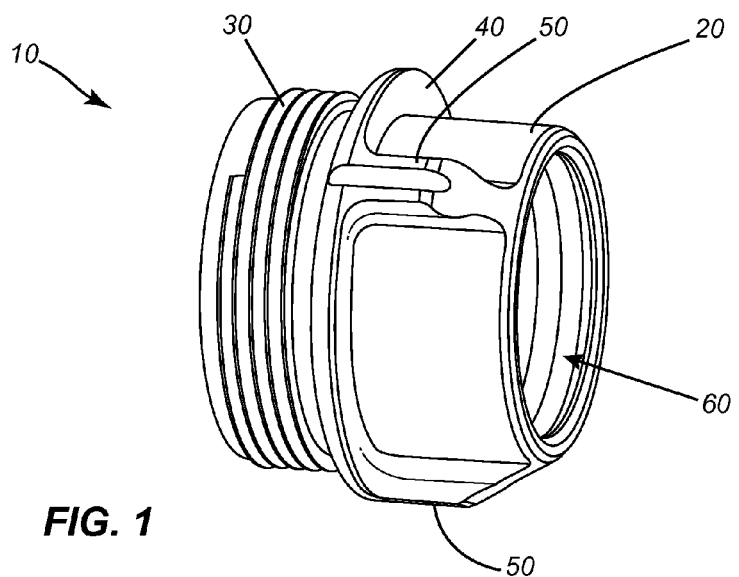
FIG. 1
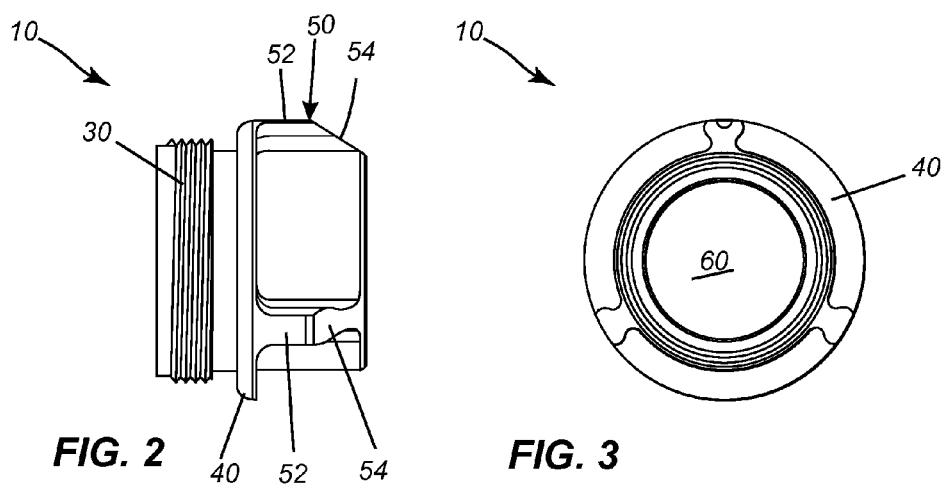
FIG. 2  FIG. 3
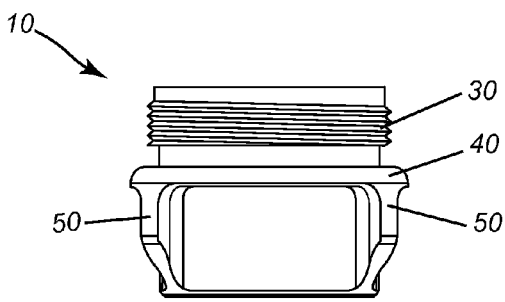
FIG. 4

LIGHTWEIGHT FIRE HOSE COUPLING WITH PROTECTIVE SHOULDER AND METHOD OF MANUFACTURING THE COUPLING

CROSS-REFERENCE TO RELATED APPLICATIONS

This is a divisional of U.S. application Ser. No. 13/788,175, filed Mar. 7, 2013, which claims the benefit of U.S. Provisional Application No. 61/608,847, filed Mar. 9, 2012, each of which is hereby incorporated by reference in their entireties.

TECHNICAL FIELD

The present technology relates generally to couplings and, in particular, to fire hose couplings.

BACKGROUND

Fire hoses are coupled together with fire hose couplings. Various types of these couplings are known in the art. Typically, one side of a coupling has an expansion ring to attach the coupling to its respective hose. On the other side of the coupling are usually a set of internal or external threads for fastening the coupling to complementary (external or internal) threads of another coupling. When the threads are external (male threads), the threads are prone to being damaged when the coupling is dropped or when it collides with hard surfaces in use. Damages threads may render the coupling inoperative or difficult to connect, which can mean that a firefighter may lose precious time at a fire scene trying to connect a damaged coupling.

Another important factor in a fire hose coupling is its mass (weight). There is a need to provide lightweight couplings without unduly sacrificing their robustness.

Accordingly, a need has existed for an improved fire hose coupling that protects the external (male) threads in a robust yet lightweight design. An improved coupling and method of manufacturing such a coupling that is robust, lightweight and that protects the external threads is disclosed in the present specification.

SUMMARY

In general, the present invention provides a robust lightweight fire hose coupling having a substantially annular body having a first end adapted to connect to a fire hose and a second end having male threads, the annular body having a central bore. The coupling includes a plurality of circumferentially spaced-apart lugs extending radially outwardly from an outer surface of the first end of the body. The coupling further includes a protective shoulder extending radially outwardly from the body between the male threads and the lugs, the protective shoulder having an outer diameter greater than an outer diameter of the male threads to thereby protect the male threads.

Thus, a main aspect of the present invention is a robust lightweight fire hose coupling comprising a substantially annular body having a first end adapted to connect to a fire hose and a second end having male threads, the annular body having a central bore. The coupling includes a plurality of circumferentially spaced-apart lugs extending radially outwardly from an outer surface of the first end of the body. The coupling further includes a protective shoulder extending radially outwardly from the body between the male threads and the lugs, the protective shoulder having an outer diameter greater than an outer diameter of the male threads to thereby protect the male threads.

Another aspect of the present invention is a method of manufacturing a robust lightweight fire hose. The method comprises providing metal bar stock, boring a hole in the metal bar stock, cutting away an outer portion of the metal bar stock to define an annular body having a constant outer diameter and to define a plurality of lugs extending radially outwardly from the annular body and to further define a shoulder that extends radially outwardly from the annular body, and cutting male threads on a second end of the annular body such that the shoulder lies between the male threads and the lugs and such that an outer diameter of the male threads is less than an outer diameter of the shoulder so that the shoulder will protect the male threads.

The details and particulars of these aspects of the invention will now be described below, by way of example, with reference to the attached drawings.

BRIEF DESCRIPTION OF THE DRAWINGS

Further features and advantages of the present technology will become apparent from the following detailed description, taken in combination with the appended drawings, in which:

FIG. 1 is an isometric view of a fire hose coupling in accordance with an embodiment of the present invention;

FIG. 2 is a side elevation view of the coupling of FIG. 1;

FIG. 3 is a front view of the coupling of FIG. 1; and

FIG. 4 is a top view of the coupling of FIG. 1.

It will be noted that throughout the appended drawings, like features are identified by like reference numerals.

DETAILED DESCRIPTION

In general, the present invention provides a novel fire hose coupling that is robust and lightweight and that include a protective shoulder that protects the male (external) threads of the coupling. The present invention also provides a method of manufacturing such a coupling.

One exemplary embodiment of the novel fire hose coupling is illustrated by way of example in FIGS. 1-4. As depicted in these figures, the novel fire housing coupling is generally designated by reference numeral 10. The coupling 10 has a substantially annular body 20 having a first end adapted to connect to a fire hose (not shown) and a second end having male (i.e. external) threads for connecting to a female-threaded (i.e. internally threaded) coupling (which is also not shown). The male threads 30 may be right-hand or left-hand threaded.

The annular body 20 has a central bore 60. The central bore may have a constant inside diameter, a varying diameter as a function of length, or two or more stepped internal diameters.

The coupling includes a plurality of circumferentially spaced-apart wrenching lugs 50 extending radially outwardly from an outer surface of the first end of the body. In the embodiment depicted in the figures, there are three lugs equally spaced-apart around the circumference of the first end of the body such that the angle between adjoining lugs is approximately 120 degrees. In other embodiments, there may be a different number of lugs. Also, in other embodiments, the circumferential spacing between adjacent lugs may not necessarily be equal. Moreover, although the lugs have the same general shape and size in the illustrated embodiment, this is not necessarily so (i.e. the lugs may have different shapes and/or sizes). Optionally, one of the lugs has a groove to indicate the start of the male thread. This is to make it easier for the firefighter to start the thread.

The coupling further includes a protective shoulder 40 extending radially outwardly from the body between the male threads and the lugs. As shown in the figures, the protective shoulder 40 is a generally annular extension that forms a disc-like collar or flange-like structure around the annular body. The protective shoulder 40 has an outer diameter greater than an outer diameter of the male threads to thereby protect the male threads. The thickness of the protective shoulder is, in the illustrated embodiment, thinner than the width of each lug. In one embodiment, the thickness of the protective shoulder for a 2"-to-2½" coupling would range from ⅛" to ⅜" inches, thereby representing approximately 3-12% of the total length of the coupling, while the outer diameter of the shoulder and lugs would exceed the outer diameter of the annular body by 25-35%. The lugs may be machined with fillets of radii ranging from ⅛"-⅜" inches at the interfaces of the shoulder and each side surface of each lug.

In the particular embodiment illustrated in the figures, the coupling is an adaptor coupling that connects hose of a first diameter to a thread of a second (larger) diameter, for example a 2" hose to a 2½" thread. It should be appreciated that this inventive concept may be applied to any coupling size and to couplings that connect a hose of a diameter equal to the thread. The couplings may be made of aluminum or any other known metal, alloy, composite, or any other suitable material. In this particular design, where the coupling connects a 2" (5.1 cm) hose to a 2½" (6.4 cm) thread and is made of aluminum, it is estimated that there is approximately a weight savings of 1 pound (0.45 kg).

In the illustrated embodiment depicted in FIGS. 1-4, each of the lugs 50 has a substantially flat top surface 52 that extends into an inclined ramp 54 that ramps down to a lip of the first end of the body. As depicted by way of example in the figures, the inclined ramp (or inclined portion) may narrow in width as it ramps down toward the lip. The ramp 54 may be linear (a straight ramp) as shown in the figures or it may be nonlinear (a curved or parabolic ramp).

Another aspect of the present invention is a method of manufacturing a fire hose coupling such as the one illustrated in FIGS. 1-4. The method in general comprises providing metal bar stock, boring a hole in the metal bar stock, cutting away an outer portion of the metal bar stock to define an annular body having a constant outer diameter and to define a plurality of lugs extending radially outwardly from the annular body and to further define a shoulder that extends radially outwardly from the annular body, and cutting male threads on a second end of the annular body such that the shoulder lies between the male threads and the lugs and such that an outer diameter of the male threads is less than an outer diameter of the shoulder so that the shoulder will protect the male threads. In other words, in this method, the shoulder is machined integrally with the lugs when machining the bar stock to produce the first end of the annular body.

In one embodiment of the method, cutting away the outer portion of the metal bar stock may be accomplished using a milling machine (either manually operated by a machinist or CNC operated) to mill the bar stock to define the annular body and the lugs.

The male threads may be turned on a lathe or cut using other machining techniques.

In one embodiment of the method, the lugs are machined to have an outer diameter substantially equal to the shoulder.

In one embodiment of the method, the lugs are machined to have a top flat surface and an inclined face that ramps down from the flat surface to a lip of a first end of the annular body as best shown in FIG. 2.

The fire hose coupling described above and illustrated in the figures is a lightweight and robust coupling that has a protective shoulder to protect the male (external) threads from damage. The manufacturing process is an efficient and cost-effective method of machining the coupling such that the protective shoulder may be easily formed to protect the male threads.

Some of the advantages over the prior art will now be described. In the novel coupling illustrated by way of example in FIGS. 1-4, there is a larger male thread than the hose diameter (e.g. male thread adapts a 2½" hose onto a 2" hose). As noted above, the shoulder of this novel coupling design protects the male threads.

Conventional prior-art fire hose couplings are normally made from extruded aluminum to save cost over forged aluminum. The primary drawback to extruding the coupling from a block of aluminum is that the features are constrained to lie along the centerline axis. In other words, it is not possible to extrude the shoulder needed to protect the male threads by extruding a length of bar stock. As a consequence of this manufacturing constraint, conventional extruded couplings have a body with the same diameter as the shoulder. The wrenching lugs thus extend beyond this outer diameter in the conventional design which may be problematic because this means the shoulder is undesirably thick and that the lugs protrude much farther outward than on the novel coupling.

The pronounced protrusion of the lugs on the conventional coupling increases the likelihood of the coupling getting hung up when pulled by a firefighter. In contrast, the novel coupling disclosed herein is much less prone to hanging up when pulled because of the lugs do not protrude nearly as much.

In conclusion, the novel coupling has much less weight than a comparable conventional coupling while still providing the shoulder to protect the external threads.

This new technology has been described in terms of specific examples, embodiments, implementations and configurations which are intended to be exemplary only. Persons of ordinary skill in the art will appreciate that obvious variations, modifications and refinements can be made without departing from the scope of the present invention. The scope of the exclusive right sought by the Applicant is therefore intended to be limited solely by the appended claims.

The invention claimed is:

1. A method of manufacturing a fire hose coupling, the method comprising:
   providing a metal bar stock;
   boring a hole in the metal bar stock;
   cutting away an outer portion of the metal bar stock to define an annular body having a constant outer diameter and to define a plurality of lugs extending radially outwardly from the annular body and to further define a single circular shoulder that extends radially outwardly from the annular body; and
   cutting male threads on a second end of the annular body such that the shoulder lies between the male threads and the lugs and such that an outer diameter of the male threads is less than an outer diameter of the shoulder, wherein the shoulder has a thickness less than a circumferential width of each lug, wherein the circumferential direction at a maximum radial extension of each lug, and wherein the shoulder of the first hose coupling protects the male threads from damage when the fire hose coupling is dropped or when the fire hose coupling collides with hard surfaces.

2. The method as claimed in claim 1 wherein cutting away the outer portion of the metal bar stock comprises using a milling machine to mill the bar stock to define the annular body and the lugs.

3. The method as claimed in claim 2 wherein the plurality of lugs comprises three lugs spaced equally apart around a circumference of the coupling.

4. The method as claimed in claim 3 wherein a thickness of the shoulder is 3-12% of a total length of the coupling.

5. The method as claimed in claim 2 wherein the lugs are machined to have a top flat surface and an inclined face that ramps down from the flat surface to a lip of a first end of the annular body.

6. The method as claimed in claim 5 wherein a thickness of the shoulder is 3-12% of a total length of the coupling.

7. The method as claimed in claim 2 wherein a thickness of the shoulder is 3-12% of a total length of the coupling.

8. The method as claimed in claim 2 wherein a thickness of the shoulder is 3-12% of a total length of the coupling and the outer diameter of the shoulder exceeds an outer diameter of the annular body by 25-35%.

9. The method as claimed in claim 1 wherein the lugs are machined to have an outer diameter substantially equal to an outer diameter of the shoulder.

10. The method as claimed in claim 9 wherein the lugs are machined to have a top flat surface and an inclined face that ramps down from the flat surface to a lip of a first end of the annular body.

11. The method as claimed in claim 10 wherein a thickness of the shoulder is 3-12% of a total length of the coupling.

12. The method as claimed in claim 9 wherein a thickness of the shoulder is 3-12% of a total length of the coupling.

13. The method as claimed in claim 9 wherein a thickness of the shoulder is 3-12% of a total length of the coupling and the outer diameter of the shoulder exceeds an outer diameter of the annular body by 25-35%.

14. The method as claimed in claim 1 wherein the lugs are machined to have a top flat surface and an inclined face that ramps down from the flat surface to a lip of a first end of the annular body.

15. The method as claimed in claim 14 wherein a thickness of the shoulder is 3-12% of a total length of the coupling.

16. The method as claimed in claim 14 wherein a thickness of the shoulder is 3-12% of a total length of the coupling and the outer diameter of the shoulder exceeds an outer diameter of the annular body by 25-35%.

17. The method as claimed in claim 1 wherein a thickness of the shoulder is 3-12% of a total length of the coupling.

18. The method as claimed in claim 1 wherein the outer diameter of the shoulder exceeds an outer diameter of the annular body by 25-35%.

19. The method as claimed in claim 1 wherein a thickness of the shoulder is 3-12% of a total length of the coupling and the outer diameter of the shoulder exceeds an outer diameter of the annular body by 25-35%.

\* \* \* \* \*